UNITED STATES PATENT OFFICE

CHARLES G. AM ENDE, OF HOBOKEN, NEW JERSEY.

IMPROVEMENT IN COMPOSITIONS FOR PRESERVING.

Specification forming part of Letters Patent No. 187,956, dated March 6, 1877; application filed August 1, 1876.

To all whom it may concern:

Be it known that I, CHARLES G. AM ENDE, of Hoboken, in the county of Hudson and State of New Jersey, have invented a new and Improved Preserving Composition, of which the following is a specification:

This invention relates to a new composition for preserving all kinds of meats, vegetables, and the like, and for protecting the same against injury by germs of putrefaction.

The invention consists in compounding boracic acid, either in a liquid or pulverous state, with chloroform, in the proportion of about twenty parts of chloroform to five hundred parts of the boracic acid; but the proportion may be varied according to the nature of the substance to be preserved, and of the atmosphere to which the same is to be exposed.

In place of chloroform, chloral hydrate, or other substance yielding chloroform on direct decomposition, may be used with substantially the same effect, and, if desired, other salts may be added to the mixture.

The composition is applied to the substance to be preserved in substantially the same manner in which preservatives are usually applied. The chloroform, owing to its subtlety, enters the pores of the substances to be preserved, and prevents the formation of fungi or algæ therein and on the surface, while the boracic acid prevents putrefaction chiefly by hindering the formation of bacteria.

I claim as my invention—

The composition of boracic acid and chloroform, or substance yielding chloroform, substantially as specified.

CHAS. G. AM ENDE.

Witnesses:
  A. V. BRIESEN,
  ERNEST C. WEBB.